United States Patent [19]
Crompton et al.

[11] 3,994,825
[45] Nov. 30, 1976

[54] PROCESS FOR MAKING COLLOIDAL SOLS OF ANTIMONY PENTOXIDE IN POLYHYDROXY ALCOHOLS

[75] Inventors: Charles Edward Crompton, Arlington Heights, Ill.; Abdula M. Z. Kazi, Euclid, Ohio

[73] Assignee: Chemetron Corporation, Chicago, Ill.

[22] Filed: Aug. 18, 1975

[21] Appl. No.: 605,287

[52] U.S. Cl. .............................. 252/309; 252/8.1; 252/314
[51] Int. Cl.² ...................................... B01J 13/00
[58] Field of Search ............... 252/309, 8.1, 314; 423/617, 87

[56] References Cited
UNITED STATES PATENTS

| | | | |
|---|---|---|---|
| 3,676,362 | 7/1972 | Yates | 252/8.1 X |
| 3,676,477 | 7/1972 | Chay et al. | 252/8.1 X |
| 3,860,523 | 1/1975 | Petrow et al. | 252/313 R X |

*Primary Examiner*—Benjamin R. Padgett
*Assistant Examiner*—E. Suzanne Parr
*Attorney, Agent, or Firm*—N. M. Esser

[57] ABSTRACT

A colloidal dispersion of hydrous antimony pentoxide particles is made by a process which comprises introducing particles of antimony trioxide into an aliphatic polyhydroxy alcohol having vicinal hydroxyl groups and contacting said particles with aqueous hydrogen peroxide at a temperature of from about 0° C to about the decomposition temperature of the reaction mixture for a length of time sufficient to convert at least a portion of the antimony particles to colloidal particles of hydrous antimony pentoxide.

9 Claims, No Drawings

3,994,825

PROCESS FOR MAKING COLLOIDAL SOLS OF ANTIMONY PENTOXIDE IN POLYHYDROXY ALCOHOLS

BACKGROUND OF THE INVENTION

The role of antimony compositions in the flameproofing of various polymers has been known for many years. One problem associated with many of the prior art antimony compositions used in flameproofing systems is the delustering of fibrous polymers. The problem may be overcome by providing an antimony composition of sufficiently small particle size, significantly less than one micron, so that the antimony particles do not scatter light and thus do not deluster the treated polymer.

Another difficulty associated with the use of an antimony composition in flameproofing polymers lies in the incorporation of the antimony compositions in the polymer. It is desirable to mix the antimony compositions in the polymer. It is desirable to mix the antimony composition with a solution of the polymer in a polar organic spinning or casting solvent prior to final product fabrication. Many prior art compositions of antimony are neither soluble nor readily dispersible in the polar organic solvents commonly used in polymer formulations.

Several methods for preparing colloidal dispersions of antimony pentoxide for use as flameproofing agents for plastics, fibers, elastomers and other polymeric compositions are known in the art. For example, U.S. Pat. No. 3,860,523 teaches a method for forming colloidal antimony pentoxide by deionizing potassium antimonate with a cation exchange resin. Another method for forming sols of antimony pentoxide is shown by U.S. Pat. No. 3,657,179 which teaches the use of antimony trichloride and nitric acid to form a dispersion in a polar organic solvent, and stabiliztion of the dispersion with an alpha-hydroxy carboxylic acid. The dispersions taught by the U.S. Pat. No. 3,657,179 contain from 0.01 to 5% water by weight.

The formation of pentavalent antimony compositions by the oxidation of trivalent antimony compositions with hydrogen peroxide is also known in the art. U.S. Pat. No. 3,836,557 shows a method for preparing water soluble salts of pentavalent antimony glycol esters by reacting antimony trioxide with hydrogen peroxide in ethylene glycol under vacuum to remove the water of reaction. U.S. Pat. No. 3,676,477 teaches the formation of pentavalent antimony esters by reacting antimony trioxide with hydrogen peroxide in a polyhydroxy alcohol with distillation to remove the water of reaction.

Many of the foregoing methods require expensive procedures for formulating compositions which can be employed effectively in relatively few polymer systems.

It is therefore an object of this invention to provide a stable dispersion of hydrous antimony pentoxide and a process for making said dispersion.

Another object of this invention is to provide hydrous antimony pentoxide sols which can be employed as flame retardant agents in natural and synthetic fibers and other polymeric materials, and a process for making said sols.

A further object of this invention is to provide an economical process for making hydrous antimony pentoxide sols from commercial grades of antimony trioxide.

Other objects of this invention will become readily apparent from the following description of the invention.

SUMMARY OF THE INVENTION

The objects of this invention may be accomplished by a method which comprises introducing particles of antimony trioxide into an aliphatic polyhydroxy alcohol having vicinal hydroxy groups and contacting said particles with aqueous hydrogen peroxide at a temperature of from about 0° C to about the decomposition temperature of the reaction mixture for a length of time sufficient to convert at least a portion of the antimony particles to colloidal particles of hydrous antimony pentoxide. The contacting of the particles of antimony trioxide with aqueous hydrogen peroxide may also be done in the presence of a halogen acid selected from the group consisting of hydrogen chloride, hydrogen bromide, and hydrogen iodide.

DESCRIPTION OF THE PREFERRED EMBODIMENTS

Any form of antimony trioxide may be used in the practice of this invention. Preferably, the antimony trioxide will have the senarmontite structure such as the commercially available antimony trioxide which is sold by Chemetron Corporation under the designation Fire-Shield High-Tint antimony trioxide. Such commercially available antimony trioxide is useful even though it is much less reactive than freshly precipitated antimony oxide or hydrated antimony oxide and is preferable in the practice of this invention because of its lower cost.

The colloidal sols are formed in a polyhydroxy alcohol containing a quantity of water. The polyhydroxy alcohols that are useful in the practice of this invention are aliphatic polyhydroxy alcohols having vicinal hydroxyl groups. Preferably the polyhydroxy alcohols contain two to six carbon atoms. The polyhydroxy alcohols that are especially useful in the practice of this invention are glycerol, ethylene glycol, 1,2-propanediol, 1,2-butanediol, 2,3 butanediol, trimethylol propane, and the like.

The halogen acids that are useful in the practice of this invention are hydrogen chloride, hydrogen bromide, and hydrogen iodide. The halogen acid is preferably added to the reaction mixture as an aqueous solution, for convenience, although gaseous hydrogen halide may be introduced into the reaction mixture if desired. Most preferably, the halogen acid is hydrogen chloride and is introduced into the reaction mixture as an aqueous solution containing 37% hydrogen chloride, by weight.

The concentration of the aqueous solution of hydrogen peroxide which may be employed in the practice of this invention is not critical. The hydrogen peroxide which is preferable in the practice of this invention, because of its lower cost, is a commercially available aqueous solution containing 35% hydrogen peroxide, by weight. If a colloidal dispersion containing a small amount of water (such as approximately 5% water, by weight) is desired, it is preferable to introduce the hydrogen peroxide as an aqueous solution contaning 70% hydrogen peroxide, by weight. The hydrogen peroxide is preferably used in a 2:1 molar ratio of hydrogen peroxide to antimony trioxide. One mole of hydrogen peroxide is thus present for each mole of trivalent antimony. The hydrogen peroxide thus reacts with the antimony trioxide according to the folowing equation:
$$Sb_2O_3 + 2 H_2O_2 \rightarrow Sb_2O_5 + 2 H_2O$$

The particles of hydrous antimony pentoxide in the dispersion of this invention may exist in many different hydrated forms, the exact nature of which is not fully known. One possible hydrated form is $Sb_4O_6(OH)_8$. Such a structure would have a tetrahedral configuration with a pentavalent antimony atom located at each apex of the tetrahedron. Two hydroxyl groups would be attached to each antimony atom which, in turn, would be bonded to each of the remaining three antimony atoms by Sb—O—Sb linkages. Another possible form of the hydrated antimony pentoxide is $Sb(OH)_5$ in which five hydroxyl groups are bonded to any given pentavalent antimony atom. It is contemplated that many solvated forms of antimony pentoxide may exist in the colloidal dispersions of this invention, all of which are included in the term hydrous antimony pentoxide. The concentration of antimony in the dispersion is not critical.

The contacting of the antimony trioxide particles with hydrogen peroxide may be accomplished at any temperature from about 0° C to about the decomposition temperature of the reaction mixture and preferably between about 50° C and about 105° C. The colloidal sol which results from the contacting of the antimony trioxide with the hydrogen peroxide is a stable colloidal dispersion of antimony pentoxide particles having an average size of from about 50A to about 200A.

The polyhydroxy alcohol acts as both a stabilizer and a dispersion medium. Since the polyhydroxy alcohol is a stabilizer for colloidal dispersion of hydrous antimony pentoxide, the relatively large amount of polyhydroxy alcohol, which is present during the oxidation of the antimony trioxide to antimony pentoxide, apparently acts to lower the activation energy for the oxidation of the trivalent antimony to pentavalent antimony and thus promotes the formation of colloidal antimony pentoxide.

The polyhydroxy alcohol also acts as the dispersion medium for the colloidal sols. The polyhydroxy alcohol medium contains water, usually at a concentration of from about 5 to about 10% of the total weight of the product sol but larger concentrations of water can be tolerated without altering the colloidal dispersion. The major portion of the water is usually introduced into the polyhydroxy alcohol medium through the addition of an aqueous hydrogen peroxide solution which usually contains about 35% hydrogen peroxide and about 65% water.

When the antimony trioxide particles are initially contacted with hydrogen peroxide, the dispersion medium consists essentially of a polyhydroxy alcohol, hydrogen peroxide, and water. There is suspended in the dispersion a large amount of non-colloidal antimony trioxide particles. As the antimony trioxide particles are contacted with hydrogen peroxide for an increasingly longer period of time, noncolloidal antimony trioxide is removed from the suspended state and converted into dispersed colloidal particles of hydrous antimony pentoxide. After the antimony trioxide particles have been contacted with the hydrogen peroxide for a finite period of time, the dispersion medium contains relatively high concentrations of hydrogen peroxide and water, and a relatively low concentration of antimony, disregarding the non-colloidal particles of antimony trioxide which are merely suspended in the dispersion medium. As the reaction proceeds, the concentrations of hydrogen peroxide and water in the dispersion medium continuously decrease. The product dispersion will usually contain a concentration of antimony of from about 0.01% to about 10%, by weight. The practical upper limit on the concentration of antimony in the dispersion is the concentration of antimony at which gel formation begins to occur. The final dispersion will usually contain approximately 10% water, by weight.

It may be desirable to introduce a halogen acid selected from the group consisting of hydrogen chloride, hydrogen bromide, and hydrogen iodide into the polyhydroxy alcohol dispersion medium so that the halogen acid is present for at least a portion of the time during which the antimony trioxide is oxidized to antimony pentoxide. If a halogen acid is present for at least a portion of the time during which particles of antimony trioxide are contacted with hydrogen peroxide, a smaller particle size is achieved in the resultant sol than in a sol prepared in a similar manner, but without the use of a halogen acid.

Preferably, a halogen acid is added to the polyhydroxy alcohol dispersion medium prior to the contacting of the antimony trioxide particles with hydrogen peroxide. The halogen acid is usually employed in a molar ratio of halogen acid to antimony of from about 0.01:1 to about 5:1. Larger concentrations of halogen acid may be employed but such concentrations tend to increase the acidity of the resultant sols, a characteristic which is undesirable for many end-use applications. Preferably, the halogen acid is employed in a molar ratio of halogen acid to antimony of from about 0.1:1 to about 1:1, and most preferably, about 0.5:1.

When halogen acid is present during the contacting of the antimony trioxide with hydrogen peroxide, the reaction temperature may be from about 0° C to about the decomposition temperature of the reaction mixture. Preferably the reaction temperature is from about 50° to about 105° C.

The use of antimony oxides to aid the flame resistance of various polymeric compositions is well known. It is preferable to use sub-micron sized particles of antimony oxide so that fibers which are treated with the antimony oxide are not delustered or plastics opacified. The colloidal dispersions of this invention are well suited for use in synthetic fibers and plastics because the average particle size of the sol is from about 50 A to about 200 A and the sols are compatible with many organic solvents which are used for the spinning and film casting of many polymers. Examples of such solvents are methanol, ethylene glycol, acetic acid, dimethyl formamide, dimethyl acetamide, formamide, trimethylolporpane and the like. Examples of polymers which may be treated with the products of this invention include polyacrylonitrile, copolymers of acrylonitrile with vinyl and vinylidene halides, polyamides, polyesters, polyurethanes, polyacrylates, polyvinyl chloride, acrylonitrile-butandiene-styrene polymers, and the like.

The following specific examples are for purpose of illustration only and are not intended to limit the scope of the invention. All percentages are by weight, unless otherwise indicated. In all cases, the antimony trioxide is Fire-Shield High-Tint antimony trioxide from Chemetron Corporation and the hydrogen peroxide solution is a commercially available aqueous solution containing 35% hydrogen peroxide by weight. The products made by the following examples may be filtered to remove undesired suspended particles.

EXAMPLES I 11.5 grams (0.12 mole) of hydrogen peroxide solution is added over a 20 minute period to a stirring mixture of 100 grams (1.67 moles) of ethylene glycol and 29 grams (0.10 mole) of antimony trioxide while maintaining the temperature of the mixture at 90°–95° C. The stirring is continued for an additional one hour and 40 minutes and a colloidal dispersion of hydrous antimony pentoxide is obtained. The size of the particles in the dispersion is about 150–200 A.

EXAMPLE II 7.5 grams (0.076 mole) of 37% hydrochloric acid is added to 140.3 grams (2.34 mole) of ethylene glycol, with stirring. 22.1 grams of antimony trioxide (0.0758 mole) is added to the stirring mixture, at room temperature followed by the addition of 14.7 grams (0.151 moles) of hydrogen peroxide. The temperature rises to about 90° C and is maintained at such temperature for about 30 minutes. A colloidal dispersion of hydrous antimony pentoxide particles having an average size of about 50 A is formed.

EXAMPLE III 11.5 grams (0.12 mole) of hydrogen peroxide solution is mixed with 50 grams of ethylene glycol and added to a stirring mixture of 29 grams of antimony oxide in 100 grams of ethylene oxide at a temperature of approximately 65° C, over a 30 minute period. The reaction mixture is allowed to stir for an additional 1 hour. A colloidal dispersion of hydrous antimony pentoxide particles having an average size of 70–120 A is formed.

While the invention has been described with reference to certain specific embodiments, it will be recognized by those skilled in the art that many variations are possible without departing from the spirit and scope of the invention.

What we claim is:

1. A process for making a colloidal dispersion of hydrous antimony pentoxide particles comprising introducing particles of antimony trioxide into an aliphatic polyhydroxy alcohol having vicinal hydroxyl groups and contacting said particles with aqueous hydrogen peroxide at a temperature of from about 0° C to about the decomposition temperature of the reaction mixture for a length of time sufficient to convert at least a portion of the antimony particles to colloidal particles of hydrous antimony pentoxide.

2. The process of claim 1 wherein the polyhydroxy alcohol contains 2 to 6 carbon atoms.

3. The process of claim 2 wherein the polyhydroxy alcohol is selected from the group consisting of glycerol, ethylene glycol, 1,2-propanediol, 1,2-butanediol, 2,3-butanediol, and trimethylolpropane.

4. The process of claim 1 further characterized by contacting said particles with aqueous hydrogen peroxide in the presence of a halogen acid selected from the group consisting of hydrogen chloride and hydrogen bromide.

5. The process of claim 4 wherein the polyhydroxy alcohol contains 2 to 6 carbon atoms.

6. The process of claim 5 wherein the polyhydroxy alcohol is selected from the goup consisting of glycerol, ethylene glycol, 1,2-propanediol, 1,2-butanediol, 2,3 butanediol, and trimethylol propane.

7. The process of claim 6 wherein the molar ratio of halogen acid to antimony is from about 0.1:1 to about 1:1.

8. The process of claim 7 wherein the halogen acid is hydrogen chloride and the molar ratio of halogen acid to antimony is about 0.5:1.

9. The process of claim 8 wherein the reaction temperature is from about 50° C to about 105° C.

* * * * *

UNITED STATES PATENT AND TRADEMARK OFFICE
CERTIFICATE OF CORRECTION

PATENT NO. : 3,994,825
DATED : November 30, 1976
INVENTOR(S) : Charles Edward Crompton and Abdula M. Z. Kazi It is certified that error appears in the above-identified patent and that said Letters Patent are hereby corrected as shown below:

Column 1, lines 20 and 21, delete "It is desirable to mix the antimony compositions in the polymer".

Column 1, line 38, correct the spelling of stabilization.

Column 2, line 64, correct the spelling of containing.

Column 4, line 56, correct the spelling of trimethylolpropane.

Column 4, line 63, correct the word purpose to read purposes.

Column 5, line 5, delete "EXAMPLES" and insert --EXAMPLE--.

Column 6, line 29, correct the spelling of the word group.

Signed and Sealed this

Fifth Day of April 1977

[SEAL]

Attest:

RUTH C. MASON
Attesting Officer

C. MARSHALL DANN
Commissioner of Patents and Trademarks